(12) United States Patent
Johnson et al.

(10) Patent No.: US 6,879,897 B2
(45) Date of Patent: Apr. 12, 2005

(54) METHOD AND SYSTEM FOR ACHIEVING CONSTANT AVERAGE IMPACT DECELERATION INDEPENDENT OF VEHICLE LOAD

(75) Inventors: Nancy L. Johnson, Northville, MI (US); Alan Lampe Browne, Grosse Pointe, MI (US)

(73) Assignee: General Motors Corporation, Detroit, MI (US)

( * ) Notice: Subject to any disclaimer, the term of this patent is extended or adjusted under 35 U.S.C. 154(b) by 62 days.

(21) Appl. No.: 10/273,709

(22) Filed: Oct. 19, 2002

(65) Prior Publication Data

US 2004/0078127 A1 Apr. 22, 2004

(51) Int. Cl.[7] .......................... B60R 21/32; B60R 22/48; B62D 23/00
(52) U.S. Cl. ...................... 701/45; 73/862.391; 177/212
(58) Field of Search ....................... 701/45; 73/862.391, 73/862.392, 862.451, 862.381, 862.382; 177/212; 180/268, 273, 290; 280/733, 806, 801.1, 735, 728.1; 296/35.2, 68.1

(56) References Cited

U.S. PATENT DOCUMENTS

| | | | |
|---|---|---|---|
| 4,886,295 A | 12/1989 | Browne | ...................... 280/777 |
| 5,498,028 A | * 3/1996 | Carlin et al. | ................. 280/735 |
| 5,727,391 A | 3/1998 | Hayward et al. | ............. 60/528 |
| 5,997,033 A | 12/1999 | Gray et al. | .................. 280/735 |
| 6,019,419 A | 2/2000 | Browne et al. | ............. 296/189 |
| 6,327,528 B1 | * 12/2001 | Vallette et al. | ................. 701/45 |
| 6,431,593 B1 | * 8/2002 | Cooper et al. | ............. 280/735 |
| 6,574,540 B2 | * 6/2003 | Yokota et al. | ................. 701/45 |
| 6,578,894 B2 | * 6/2003 | Motozawa | .................. 296/35.2 |
| 6,636,792 B2 | * 10/2003 | Graf et al. | ..................... 701/45 |
| 6,647,811 B2 | * 11/2003 | Blakesley et al. | ...... 73/862.391 |

FOREIGN PATENT DOCUMENTS

| | | |
|---|---|---|
| JP | 4-76274 | 3/1992 |
| JP | 7-42893 | 2/1995 |
| WO | 99/03711 | 1/1999 |
| WO | 01/26952 | 4/2001 |

* cited by examiner

*Primary Examiner*—Tan Q. Nguyen
*Assistant Examiner*—Dalena Tran
(74) *Attorney, Agent, or Firm*—Kathryn A. Marra

(57) ABSTRACT

A method for achieving a constant average deceleration of a vehicle is disclosed. In an exemplary embodiment, the method includes comparing an effective load mass of the vehicle to a baseline load mass. If the effective load mass differs from the baseline load mass by at least a designated percentage, then upon detection of a vehicle impact, energy absorbing structures within the vehicle are adjusted so as to alter crush forces of the vehicle, thereby resulting in a desired average deceleration of the vehicle.

16 Claims, 3 Drawing Sheets

|  | Vehicle mass (including fuel) (kg) | operating mass (kg) | crush force | average acceleration | crush distance |
|---|---|---|---|---|---|
| 208 test (fully fueled, two 90 kg passengers) | 850 | 1030 | F(d) | a | D |
| Maximum operating mass (fully fueled, five 90 kg adults, 130 kg luggage) | 850 | 1430 | F(d) | 0.72a | 1.39D |
| Minimum operating mass (11 gallons below full, one 45 kg adult, no luggage) | 825 | 870 | F(d) | 1.18a | 0.84D |

*FIG. 4*

METHOD AND SYSTEM FOR ACHIEVING CONSTANT AVERAGE IMPACT DECELERATION INDEPENDENT OF VEHICLE LOAD

BACKGROUND

The present disclosure relates generally to energy absorbent occupant protection systems in vehicles and, more particularly, to a method and system for achieving a constant average impact deceleration independent of vehicle load.

Existing motor vehicle structures deliver a specific crush force/deflection trace for an impact event. With such "fixed" structures, changes in the mass of the cargo carried by the vehicle affect the amount of crush, but do not have any significant effect in the crush force that the structure generates at a particular point during the crush. Since the trace of crush force versus crush distance does not vary, while the total loaded vehicle mass can vary for a given vehicle, the vehicle deceleration during an impact can also vary.

However, present occupant restraint systems are designed to provide maximum benefit for a particular vehicle impact pulse corresponding to a specific loaded vehicle mass. As a result, if the loaded vehicle mass is significantly changed, thus resulting in a corresponding significant change in average vehicle deceleration (inversely proportional to the vehicle mass), then the overall effectiveness of the occupant restraint system will be altered. If a vehicle were carrying a "lighter than normal" load (e.g., such as a nearly empty fuel tank, no vehicle cargo, and a single, light driver), then given a constant crush force, the magnitude of the average vehicle deceleration during an impact will be increased with respect to the value at the designed mass, due to the relative decrease in loaded vehicle mass.

On the other hand, if a vehicle were carrying a "heavier than normal load (e.g., a full fuel tank, a heavy cargo load, and five adult passengers), then the relative increase in mass results in a relative decrease in vehicle (and thus belted occupant) deceleration. Although a decrease in average vehicle deceleration is not, by itself, an undesirable condition, it is equally true that a vehicle with increased mass has greater kinetic energy. Therefore, with greater kinetic energy and constant crush force of the vehicle structures, there is also an increase in crush distance.

SUMMARY

In an exemplary embodiment, a method for achieving a constant average deceleration of a vehicle includes comparing an effective load mass of the vehicle to a baseline load mass. If the effective load mass differs from the baseline load mass by a designated percentage, then upon detection of a vehicle impact, energy absorbing structures within the vehicle are adjusted so as to alter crush forces of the vehicle, thereby resulting in a desired average deceleration of the vehicle.

In another embodiment, method for achieving a constant average deceleration of a vehicle includes determining a gross loaded vehicle mass and determining, for each occupant of the vehicle, occupant restraint status information. The occupant restraint status information is indicative of whether the occupant is restrained within the vehicle. Then, an effective loaded mass of the vehicle is calculated, based upon the gross loaded vehicle mass and the occupant restraint status information, and compared to a baseline loaded mass. If the effective loaded mass differs from the baseline loaded mass by a designated percentage, then upon detection of either a vehicle impact or an imminent vehicle impact, adjusting energy absorbing structures within the vehicle are adjusted so as to alter crush forces of the vehicle, thereby resulting in a desired average deceleration of the vehicle.

In still another embodiment, a system for achieving a constant average deceleration for a vehicle that is independent of the load that it is carrying includes a system controller, a plurality of load sensors in communication with the system controller, a plurality of seat load sensors in communication with the system controller, and a plurality of seat belt use sensors in communication with the system controller. At least one impact sensor in communication with the system controller is included for detecting a vehicle impact, as well as at least one energy absorbing structure within the vehicle. If an effective loaded mass of the vehicle differs from a baseline loaded mass by a designated percentage, then the system controller causes the at least one energy absorbing structure to be adjusted so as to alter crush forces of the vehicle, thereby resulting in a desired average deceleration of the vehicle.

BRIEF DESCRIPTION OF THE DRAWINGS

Referring to the exemplary drawings wherein like elements are numbered alike in the several Figures:

FIG. 4 is a table illustrating impact test simulation results of a conventional vehicle having a constant crush force, conducted at a baseline loaded mass, a maximum operating loaded mass, and a minimum operating loaded mass.

DETAILED DESCRIPTION

Disclosed herein is a method and system for achieving a constant average impact deceleration independent of a vehicle load. Briefly stated, the disclosure provides for a means of adjusting vehicle crush forces in proportion to a determined significant change in the loaded mass such that the average deceleration remains the same independent of the load. Thereby, an occupant restraint system may be tuned to a vehicle specific average deceleration, rather than a vehicle load dependent deceleration.

Figure 1:
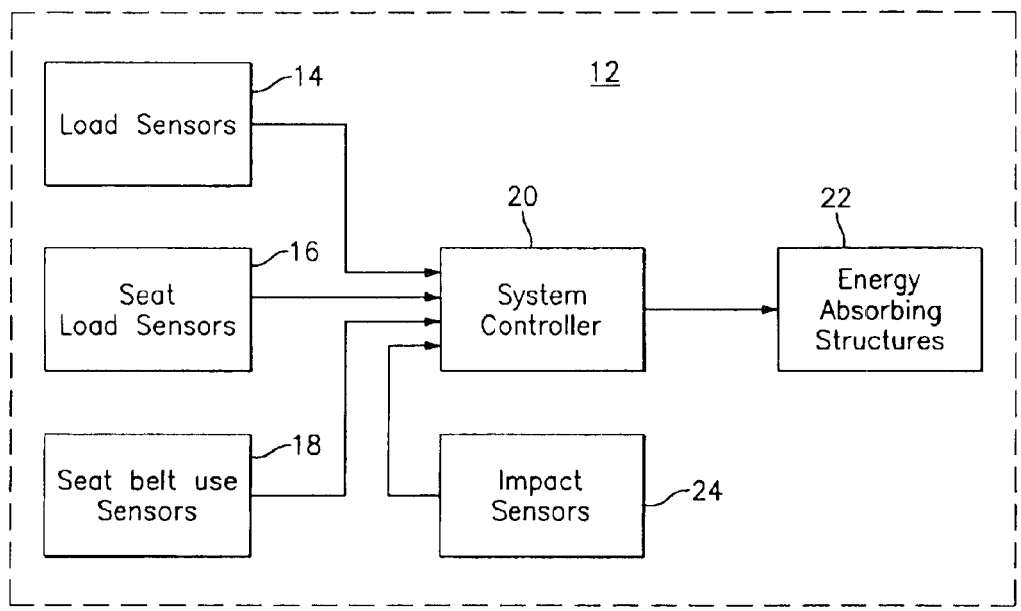
FIG. 1 is a block diagram illustrating a system for achieving a constant average deceleration of a vehicle in accordance with an embodiment of the invention.
Figure 2:
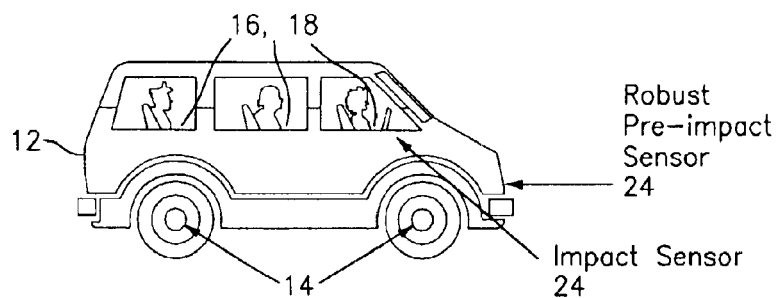
FIG. 2 is a schematic diagram of the system shown in FIG. 1.

Referring initially to FIGS. 1 and 2, there is shown a block diagram and schematic illustrating a system 10 for achieving a constant average deceleration of a vehicle 12. The system 10 includes a combination of various sensors including, but not necessarily limited to, load sensors 14 configured within the vehicle suspension to measure the gross loaded vehicle mass, seat load sensors 16 to measure occupant masses, and seat belt use sensors 18. The seat belt use sensors 18 determine whether the vehicle occupant(s) are restrained so that their translational energy will be dissipated through vehicle crush.

A system controller 20 receives the inputs from the various sensors and, as is described in greater detail hereinafter, compares an effective loaded mass to a normal loaded vehicle mass (for which the vehicle's restraint system was tuned) and then determines if there is a threshold percentage difference therebetween. Any determined mass difference is then used by the controller 20, once an impact is detected, to selectively deploy, undeploy, or alter the stroking force of one or more energy absorbing structures 22. An impact may be detected though impact sensors 24, which may generally include existing impact sensors, vehicle deformation sensors associated with the impact, and/or robust pre-impact sensors (e.g., radar) that may become commercially available.

Any modifications made to the energy absorbing structures 22 are preferably sufficient in number and extent so as to either augment or reduce the crush force, thereby producing a desired constant, average vehicle deceleration independent of the loaded mass. For vehicles whose restraint systems are tuned for a lightly loaded condition, the energy absorbing structures 22 would be deployed (i.e., adjusted to have their stroking forces increased) to augment the vehicle crush force. Conversely, for vehicles whose restraint systems are tuned for a heavily loaded condition, the energy absorbing structures 22 would be "undeployed" (i.e., adjusted to have their stroking forces reduced) in order to reduce the overall vehicle crush force.

Examples of suitable energy absorbing structures that could be selectively deployed include, but are not limited to, expandable space-filling crush structures, inflatable structures such as plastic or metallic bellows, pistons used in pneumatic or hydraulic stroking devices, and the stroking element in a one-way interlocking rachet-type mechanism. Examples of energy absorbing structures that could be selectively undeployed include, but are not limited to, compressible space-filling crush structures and the initially extended piston in pneumatic or hydraulic stroking devices. Examples of devices that may be adjusted to have their stroking forces either increased or decreased include pneumatic and hydraulic stroking devices (that operated by changing, for example, the size of the orifice/flow restriction, as is disclosed in U.S. Pat. No. 4,886,295 to Browne), as well as magnetorheological material stroking devices (that operate by changing material shear force through the modulation of an applied magnetic field).

Figure 3:
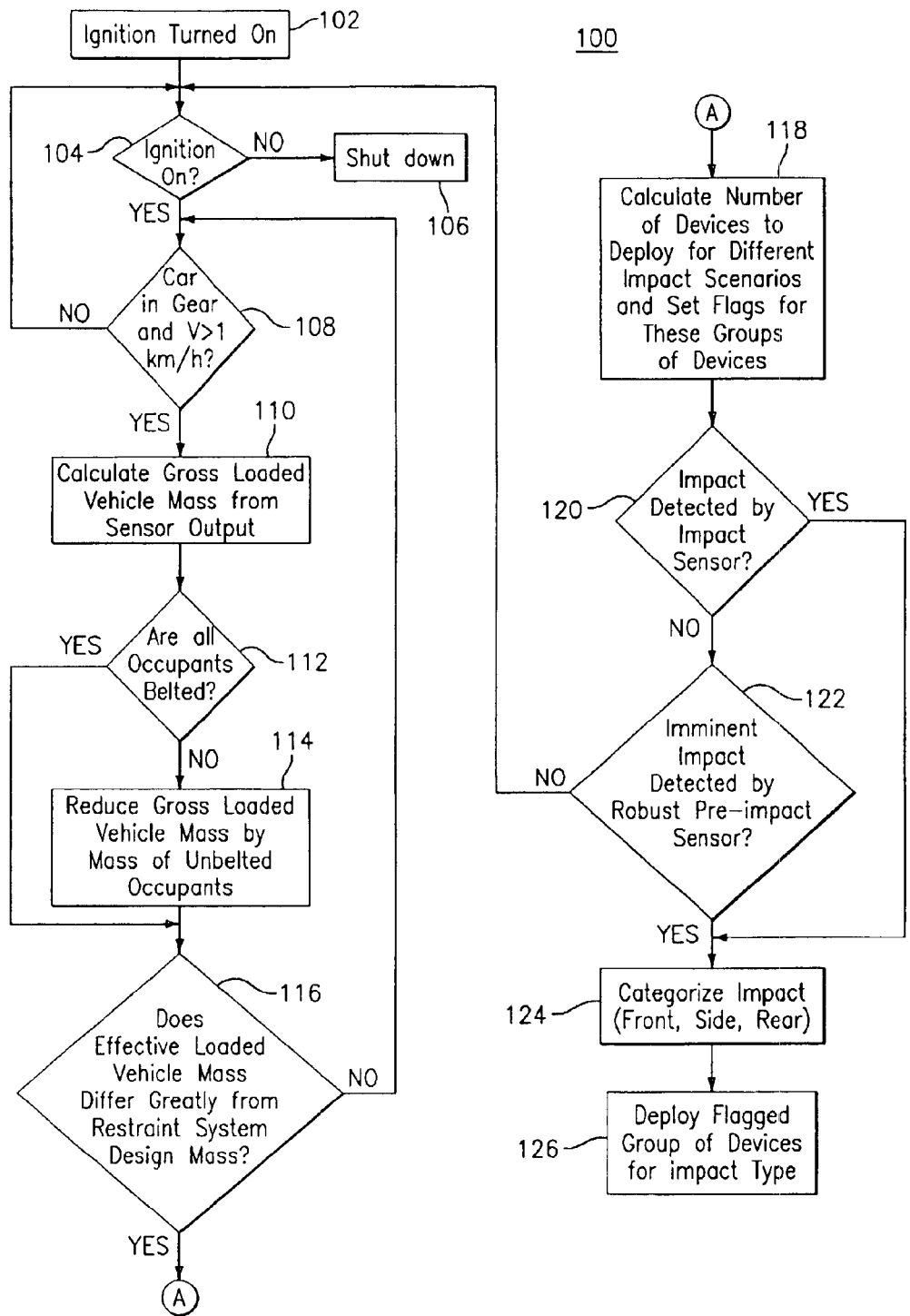
FIG. 3 is a flow diagram illustrating an exemplary method for achieving a constant average deceleration of a vehicle that may be implemented in the system of FIGS. 1 and 2.

Referring now to FIG. 3, there is shown a flow diagram illustrating an exemplary method 100 for achieving a constant average deceleration of a vehicle, in accordance with an embodiment of the invention. The system is initialized once the vehicle's ignition is turned on, as shown in block 102. If the ignition does not remain on, the method 100 proceeds from decision block 104 to block 106 where the system is shut down. Assuming however, that the ignition remains on, method 100 proceeds to decision block 108. If the vehicle is not traveling in excess of a certain speed (e.g., 1 km/h), the method 100 loops back to decision block 104. Otherwise, the gross loaded vehicle mass is calculated at block 110. As stated previously, the gross loaded vehicle mass may be calculated through load sensors located in the vehicle's suspension, along with seat sensors for determining occupant mass and seatbelt use sensors.

Because the gross loaded vehicle mass is not necessarily the same as the effective loaded vehicle mass, it is determined at decision block 112 whether all of the vehicle's occupants are seat belted. If not, method 100 proceeds to block 114 where the effective loaded vehicle mass is calculated by subtracting the mass of any unbelted occupants from the gross loaded vehicle mass before proceeding to decision block 116. On the other hand, if each vehicle occupant is wearing a seat belt, then method 100 proceeds directly to decision block 116, where the effective loaded vehicle mass is compared with a baseline loaded mass used in the design of the vehicle's restraint systems. If there is a "significant" difference between the two, such as may be defined by a threshold percentage difference, for example, then the method 100 will proceed block 118, as described hereinafter. However, if the difference between the effective loaded vehicle mass and the baseline mass does not exceed the threshold percentage difference, then the method 100 simply returns to decision block 108.

Once method 100 reaches block 118 (i.e., a "significant" difference between the effective loaded vehicle mass and the baseline mass is determined to exist), then calculations are performed to determine which and how many of a number of energy absorbing structures are adjusted to alter the crush forces of the vehicle. Then, the method 100 proceeds to decision block 120 for determination of whether an impact has been determined by one or more impact sensors within the vehicle. Without an impact, the calculations regarding effective loaded vehicle mass and the deployment of certain energy absorbing structures will not be utilized to alter the stroking forces of such structures. As such, the method may be returned to the beginning to repeat the process.

By way of simplified example, it will be assumed that the controller is programmed with a threshold baseline loaded mass variation of 10%. That is, crush forces will be altered if the effective loaded vehicle mass differs from the baseline loaded mass by 10% or more, either greater or lesser. It is further assumed that each individual energy absorbing device, when deployed, undeployed or both increases/decreases the stroke force by 10%. If during a vehicle impact the effective loaded mass differs from the baseline loaded mass by +5%, for example, then no alteration of any of the energy absorbing structures takes place because the threshold value has not been met.

If during a vehicle impact, the effective loaded mass differs from the baseline loaded mass by −15%, for example, then one of the energy absorbing structures will have its stroking force decreased by 10%, the particular one depending upon the area of impact. In still another example, if the effective loaded mass differs from the baseline loaded mass by +25%, for example, then two of the energy absorbing structures will each have its stroking force increased by 10%. It should be appreciated, however, that the threshold percentages and the percentages by which the stroking forces are increased/decreased are exemplary in nature, and different percentages may be used.

In addition, the method 100 may also utilize robust sensing devices, such as radar systems for example, to also detect an imminent impact. Thus, as shown in FIG. 3, if an actual impact is not detected at decision block 120, the method 100 will then proceed to decision block 122 where it is further determined whether an imminent impact is detected. If neither an actual nor an imminent impact is detected, then method 100 returns back to decision block 104. However, if either an actual impact or an imminent impact is detected, then method 100 proceeds to block 124, where the particular impact location is categorized (e.g., front, side, rear). Finally, at block 126, those energy absorbing structures that were identified in block 118 are deployed, based upon the earlier calculations and the type of impact/imminent impact.

FIG. 4 is a table illustrating impact test simulation results of a conventional vehicle having a constant crush force F(d), conducted at a baseline loaded mass (208 test), a maximum operating loaded mass, and a minimum operating loaded mass. In the case of the baseline loaded mass, the test vehicle had an operating mass of about 1030 kg, including a fully fueled gas tank and two, 90 kg occupants. Following an impact of the baseline loaded mass vehicle, the average vehicle deceleration is given by "a", and the resulting crush distance is given by "D".

When the test vehicle was fully loaded, the vehicle had an operating mass of 1430 kg, including a fully fueled gas tank and five, 90 kg occupants. Following impact of this increased loaded mass vehicle, the average deceleration decreased to 0.72a, while the crush distance increased to 1.39D. Conversely, when the test vehicle was minimally loaded, it had a nearly empty fuel tank with a single, 45 kg occupant. As a result, an impact produced a higher average deceleration of 1.18a, and a shorter crush distance of 0.84D.

As will be appreciated from the exemplary test data of FIG. 4, the variation in vehicle loaded mass has an effect on the occupant restraint system from the perspective of average vehicle (and thus belted occupant) deceleration and crush distance. In the case of a greater then normal loaded mass, while there is a lower average vehicle (and thus belted occupant) deceleration following an impact, there is also an increased crush distance associated therewith that corresponds to greater vehicle deformation. Thus, by having the capability to increase the stroking force of one or more of the energy absorbing structures, the average deceleration from an impact may be increased to a value corresponding to the design parameters of the occupant restraint system (e.g., an average deceleration of "a"). That way, the crush distance may be reduced to "D". In the case of a lesser then normal loaded mass, while there is a decreased crush distance following an impact, there is also an increased average vehicle (and thus belted occupant) deceleration. By having the capability of decreasing the stroking force of one or more of the energy absorbing structures, the crush distance may be increased to a value of about "D", thereby decreasing the average occupant deceleration to a value of about "a".

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for achieving a constant average deceleration of a vehicle, the method comprising:
    comparing an effective loaded mass of the vehicle to a baseline loaded mass; and
    if said effective loaded mass differs from said baseline loaded mass by at least a designated percentage, then upon detection of a vehicle impact, adjusting energy absorbing structures disposed within and to affect the structure of the vehicle so as to alter crush forces of the vehicle, thereby resulting in a desired average deceleration of the vehicle.

2. The method of claim 1, further comprising:
    determining a gross loaded vehicle mass;
    determining, for each occupant of the vehicle, occupant mass and restraint status information, said occupant restraint status information indicative of whether said occupant is restrained within the vehicle; and
    calculating said effective loaded mass of the vehicle, based upon said gross loaded vehicle mass and said occupant mass and restraint status information.

3. The method of claim 2, wherein:
    if said effective loaded mass exceeds said baseline loaded mass by at least said designated percentage, then a stroking force of at least one selected energy absorbing structure is increased upon detection of a vehicle impact.

4. The method of claim 2, wherein:
    if said effective load mass is less than said baseline load mass by at least said designated percentage, then a stroking force of at least one selected energy absorbing structure is decreased upon detection of a vehicle impact.

5. The method of claim 2, wherein:
    if said effective loaded mass exceeds said baseline loaded mass by at least said designated percentage, then a stroking force of at least one selected energy absorbing structure is increased upon detection of a vehicle impact; and
    if said effective load mass is less than said baseline load mass by at least said designated percentage, then a stroking force of at least one selected energy absorbing structure is decreased upon detection of a vehicle impact.

6. The method of claim 5, wherein said at least one selected energy absorbing structure includes at least one of: an expandable space-filling crush structure, an inflatable structure, a metallic bellows, a piston, a compressible space-filling crush structure, a pneumatic stroking device, a hydraulic stroking device, and a magnetorheological material stroking device.

7. The method of claim 2, wherein:
    said gross loaded vehicle mass is determined from load sensors within the vehicle;
    said occupant mass and restraint status information is determined from seat load sensors and seat belt use sensors within the vehicle.

8. A method for achieving a constant average deceleration of a vehicle, the method comprising:
    determining a gross loaded vehicle mass;
    determining, for each occupant of the vehicle, occupant mass and restraint status information, said occupant mass and restraint status information indicative of whether said occupant is restrained within the vehicle;
    calculating an effective loaded mass of the vehicle, based upon said gross loaded vehicle mass and said occupant mass and restraint status information;
    comparing said effective loaded mass of the vehicle to a baseline loaded mass; and
    if said effective loaded mass differs from said baseline loaded mass by at least a designated percentage, then upon detection of either a vehicle impact or an imminent vehicle impact, adjusting energy absorbing structures disposed within and to affect the structure of the vehicle so as to alter crush forces of the vehicle, thereby resulting in a desired average deceleration of the vehicle.

9. The method of claim 8, wherein:
    if said effective loaded mass exceeds said baseline loaded mass by at least said designated percentage, then a stroking force of at least one selected energy absorbing structure is increased upon detection of a vehicle impact; and
    if said effective load mass is less than said baseline load mass by at least said designated percentage, then a stroking force of at least one selected energy absorbing structure is decreased upon detection of a vehicle impact.

10. The method of claim 9, wherein said at least one selected energy absorbing structure includes at least one of: an expandable space-filling crush structure, an inflatable structure, a metallic bellows, a piston, a compressible space-filling crush structure, a pneumatic stroking device, a hydraulic stroking device, and a magnetorheological material stroking device.

11. The method of claim 9, wherein:

said gross loaded vehicle mass is determined from load sensors within the vehicle;

said occupant mass is determined from seat load sensors within the vehicle; and said occupant restraint status information is determined from seat belt use sensors within the vehicle.

12. The method of claim 9, wherein:

said vehicle impact is determined from at least one impact sensor within the vehicle; and said imminent vehicle impact is determined from at least one robust pre-impact sensor within the vehicle.

13. The method of claim 9, wherein said at least one selected energy absorbing structure includes at least one of: an expandable space-filling crush structure, an inflatable structure, a metallic bellows, a piston, a compressible space-filling crush structure, a pneumatic stroking device, a hydraulic stroking device, and a magnetorheological material stroking device.

14. A system for achieving a constant average deceleration of a vehicle, comprising:

a system controller;

a plurality of load sensors included in the vehicle and in communication with said system controller;

a plurality of seat load sensors in the vehicle and in communication with said system controller;

a plurality of seat belt use sensors in the vehicle and in communication with said system controller;

at least one impact sensor for detecting a vehicle impact, said at least one impact sensor in communication with said system controller; and at least one energy absorbing structure disposed within and to affect the structure of the vehicle;

wherein, if an effective loaded mass of the vehicle differs from a baseline loaded mass by at least a designated percentage, then said system controller causes said at least one energy absorbing structure to be adjusted so as to affect the structure and alter crush forces of the vehicle, thereby resulting in a desired average deceleration of the vehicle.

15. The system of claim 14, wherein said system controller calculates said effective loaded mass by:

determining a gross loaded vehicle mass from said load sensors;

determining, for each occupant of the vehicle, occupant mass and restraint status information from said plurality of seat load sensors and said plurality of seat belt use sensors, said occupant mass and restraint status information indicative of the mass of any unbelted occupants of the vehicle; and reducing said gross loaded vehicle mass by the mass of unbelted occupants.

16. The system of claim 14, wherein:

if said effective loaded mass exceeds said baseline loaded mass by at least said designated percentage, then said system controller causes a stroking force of at least one selected energy absorbing structure to be increased upon detection of a vehicle impact; and if said effective load mass is less than said baseline load mass by at least said designated percentage, then said system controller causes a stroking force of at least one selected energy absorbing structure to be decreased upon detection of a vehicle impact.

* * * * *